United States Patent [19]

Belote et al.

[11] 4,446,301

[45] May 1, 1984

[54] MODIFIED POLYESTERS

[75] Inventors: Stephen N. Belote; Don R. Leonard, both of Kingsport, Tenn.; Garrett C. Luce, Longview, Tex.

[73] Assignee: Eastman Kodak Company, Rochester, N.Y.

[21] Appl. No.: 519,942

[22] Filed: Aug. 3, 1983

[51] Int. Cl.$^3$ .................... C08G 63/54; C08G 63/48
[52] U.S. Cl. .................... 528/295.3; 523/160; 523/161; 528/289; 528/295.5
[58] Field of Search .................. 528/295.3, 295.5, 289; 523/160, 161

[56] References Cited

U.S. PATENT DOCUMENTS 4,368,316 1/1983 Laddha et al. .................. 528/295.5

Primary Examiner—Lucille M. Phynes
Attorney, Agent, or Firm—David E. Cotey; Daniel B. Reece, III

[57] ABSTRACT

The present invention provides imide-containing and amide-containing polyester resins which are useful in the formulation of coating compositions and inks. The resins comprise the reaction product of an imide or amide, a polyester-forming polyol, a polyester-forming multifunctional acid or derivative thereof, and, optionally, a fatty oil or an unsaturated fatty acid derived from a fatty oil. The imide or amide is derived from a specified alkanolamine and an imide-forming or amide-forming reactant. The alkanolamine is a primary branched alkanolamine wherein the branched alkyl group preferably contains about 2 to 10 carbon atoms. A preferred alkanolamine is 2,2-dimethyl-3-amino-1-propanol.

33 Claims, No Drawings

MODIFIED POLYESTERS

DESCRIPTION

BACKGROUND OF THE INVENTION

The present invention relates to novel modified polyester resins. The resins comprise typical polyester-forming polyols, polyester-forming multi-functional acids or derivatives thereof, and, optionally, fatty oils or unsaturated fatty acids, in conjunction with specifically defined imide or amide moieties. The imide or amide moieties are prepared from a defined class of alkanolamines. Specifically, the compositions of the present invention comprise an imide or amide moiety which is derived from a branched primary alkanolamine.

The modified polyesters of the present invention may be referred to as "polyesterimides" and "polyesteramides"; however, it will be understood that the imide or amide moieties may be incorporated into the main polymer chain or may be pendent to the polymer chain.

The compositions of the present invention find use as coating resins, as binders for flexographic inks, etc. More specifically, certain of the resins of the present invention are useful in the preparation of coatings for metal substrates, e.g., as primer compositions, etc.

In the coatings industry there is a desire for compositions which are capable of air drying in short periods of time and without the necessity of high temperatures which require increases in energy expenditures. In an attempt to accomplish this goal, the prior art has taught the use of resins which have been end-capped with benzoic acid so as to improve the drying properties of coating resins without significantly increasing the molecular weight thereof. However, such resins have proven to be undesirably brittle when cured. Furthermore, it is desirable that coating compositions have a high solids content. Prior art resins have been incapable of providing the combination of high solids and good air-dry properties. In contrast to the prior art, it has now been found that the resins of the present invention which comprise an imide or amide moiety derived from a primary branched alkanolamine are capable of providing a uniquely advantageous combination of these desirable properties.

Polyesteramides and polyesterimides are known in the art as a general class of compounds. These resins exhibit a broad range of properties depending upon the specific composition of the material. Certain of the polyesterimides disclosed in the art have found utility as electrical insulations, such as in insulation varnishes. Polyesterimides which are useful in such applications must exhibit good heat resistance and are generally highly crystalline. An example of such resins can be found in U.S. Pat. No. 4,375,528, which discloses imidized polyesters which incorporate units derived from organic diamines. The organic diamines are preferably aromatic amines such as methylene dianiline, oxydianiline, phenylene diamines, etc. This patent neither discloses nor suggests the use of alkanolamines, and the resins disclosed therein do not exhibit the advantageous properties of the resins of the present invention.

U.S. Pat. No. 4,069,209 also discloses synthetic resins which are suitable for use as electrical insulation materials. The resins comprise aminodicarboxylic acids which are prepared from amino acids and tri- and tetracarboxylic acids, such as trimellitic acid, pyromellitic acid, and the anhydrides thereof. Again, the compositions of the present invention are neither disclosed nor suggested by this patent; there is no teaching of the inclusion of an imide or amide moiety derived from a branched primary alkanolamine.

U.S. Pat. No. 3,729,446 discloses imido-substituted polyester compositions which can be employed as coatings, varnishes, injection molding compounds, etc. These compositions are characterized as having at least one chemically combined aliphatically unsaturated imido radical. Again, however, the disclosed radicals do not comprise a primary imido group and a branched alkyl chain, as do the resins of the present invention.

U.S. Pat. No. 4,245,086 discloses the reaction product of trimellitic anhydride and a monoalkanolamine. The patent further discloses the polycondensation product of such a compound. The polymer is useful in the form of fibers, woven cloths, knitted cloths, films, sheets, and molded products. Again, this reference neither discloses nor suggests the resins of the present invention which contain ester linkages.

Defensive Publication No. 673,959, published Sept. 30, 1969, discloses highly polymeric linear condensation polymers prepared from 2,2-dimethyl-5-aminopentanol-1 and at least one bifunctional carboxy compound or derivative thereof. These products are amorphous, non-crystallizable polymers which are useful in the production of molded objects, sheeting, film, and hot-melt adhesives. The resins disclosed in this publication are thus two-component polymers which do not include polyol moieties therein. Furthermore, the compositions of the publication are not useful as coating compositions and do not provide the unique advantages provided by the compositions of the present invention.

Thus, there is provided by the present invention a class of polyesterimides and polyesteramides which have not been disclosed in the prior art. These resins are useful in the preparation of coating compositions, flexographic inks, etc.

SUMMARY OF THE INVENTION

The present invention provides novel modified polyester resins. In one aspect of the present invention, the resin comprises the reaction product of
- (A) an imide derived from an alkanolamine and an imide-forming reactant selected from phthalic acid, trimellitic acid, pyromellitic acid, succinic acid, maleic acid, anhydrides of the foregoing, and mixtures thereof;
- (B) a polyester-forming polyol;
- (C) a polyester-forming multifunctional acid or derivative thereof; and, optionally,
- (D) a fatty oil or an unsaturated fatty acid having about 12 to 24 carbon atoms derived from a fatty oil.

The imide has the following formula

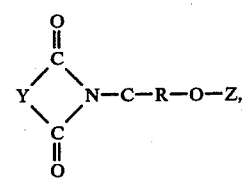

wherein R represents a branched alkyl group having about 2 to 10 carbon atoms; Y represents the residue of the imide-forming reactant; and Z represents hydrogen or the residue of a carboxylic acid or derivative thereof, provided that the imide provides at least one hydroxyl or carboxyl group which is available for reaction. In the resin of the present invention, the alkanolamine is provided in an amount of about 0.5 to 30% by weight, based upon the total weight of reactants, and the fatty oil or acid, if present, comprises about 30 to 60% by weight of the resin.

In another aspect of the present invention, there is provided a novel modified polyester resin which comprises the reaction product of (A) an amide derived from an alkanolamine and an amide-forming reactant,
(B) a polyester-forming polyol,
(C) a polyester-forming multifunctional acid or derivative thereof, and, optionally,
(D) a fatty oil or an unsaturated fatty acid having about 12 to 24 carbon atoms derived from the oil.

The amide has the following formula

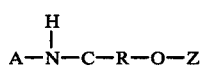

wherein R represents a branched alkyl group having about 2 to 10 carbon atoms, Z represents hydrogen or the residue of a carboxylic acid or derivative thereof, and A represents the residue of a carboxylic acid or derivative thereof, provided that the amide provides at least one hydroxyl or carboxyl group which is available for reaction. In the resin of this aspect of the invention, the alkanolamine is provided in an amount of about 0.5 to 30% by weight, based upon the total weight of reactants, and the fatty oil or acid, if present, comprises about 30 to 60% by weight of the resin.

DETAILED DESCRIPTION OF THE INVENTION

The present invention provides novel modified polyester resins which exhibit properties rendering the resins highly useful in such applications as coating compositions, inks, and the like. The term "polyester resin" as used herein denotes polyesters formed from polyols and multifunctional acids and also those resins which are commonly termed "alkyd resins" which additionally employ one or more fatty oils or fatty acids. The resins of the present invention contain imide and/or amide groups which are derived from a specified class of alkanolamines.

The alkanolamines which are useful in preparing the resins of the present invention can be characterized as primary branched alkanolamines. Such compounds have the following general formula H$_2$N—C—R—OH 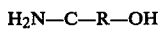

wherein R represents a branched alkyl group having about 2 to 10 carbon atoms. Preferred examples of alkanolamines within this class include 2-aminomethyl-2-ethyl-1-hexanol, 2-aminomethyl-2-ethyl-1-pentanol, 2-aminomethyl-2-ethyl-1-butanol, 2-aminomethyl-2-methyl-1-butanol, 2,2-dimethyl-3-amino-1-propanol, etc. This list is not exhaustive of all compounds included within the class defined above; other alkanolamines meeting the above description will be apparent to the person of ordinary skill in the art. The alkanolamine which is preferred for use in the resins of the present invention is 2,2-dimethyl-3-amino-1-propanol. Mixtures of alkanolamines within the defined class are also suitable for use in the resins of the present invention.

The modified polyester resins of the present invention comprise about 0.5 to 30% by weight, based upon the total weight of the reactants, of the alkanolamine. Preferably, the alkanolamine is provided in an amount of about 5 to 15% by weight.

In accordance with the present invention, alkanolamines of the type described above are reacted with imide-forming or amide-forming reactants so as to form an imide or amide intermediate. It is known in the art (see, for example, U.S. Pat. No. 4,245,086) that compounds of this type can be prepared and, if desired, isolated. However, in preparing the resins of the present invention, this intermediate need not be isolated but can be immediately reacted with the polyester-forming polyols and/or multifunctional acids to be described below so as to form the resins of the present invention.

The imide-forming reactants which can be employed in the present invention can be any of a number of di-, tri-, and tetrafunctional acids or, more preferably, anhydrides. Among such imide-forming reactants can be mentioned phthalic anhydride, trimellitic anhydride, pyromellitic dianhydride, succinic anhydride, maleic anhydride, mixtures of the foregoing, etc. Other imide-forming reactants will be apparent to the person of ordinary skill in the art. Preferred imide-forming reactants are phthalic anhydride, trimellitic anhydride, and pyromellitic dianhydride, with phthalic anhydride and trimellitic anhydride being most preferred.

While maleic anhydride may be used as an imide-forming reactant, the preparation of an imide therefrom requires multiple steps and the use of a solvent. Therefore, as a practical matter, maleic anhydride is less favorable than other imide-forming reactants.

The imide intermediate derived from the above-described alkanolamines and an imide-forming reactant will thus have the formula

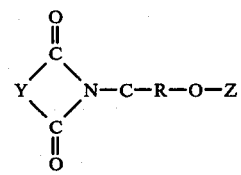 (I)

wherein R has the meaning defined above, Y represents the residue of the imide-forming reactant, and Z represents hydrogen or the residue of a carboxylic acid or derivative thereof. Suitable carboxylic acid derivatives include esters, anhydrides, acid halides, etc.

Preferably, the imide intermediate has the formula

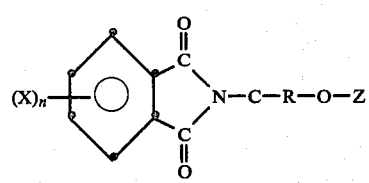 (II)

wherein R has the meaning defined above, X represents a carboxylic acid moiety, wherein n is 0 to 2, and Z has the meaning defined above.

A particularly preferred imide intermediate is prepared from phthalic anhydride and 2,2-dimethyl-3-amino-1-propanol and has the following formula

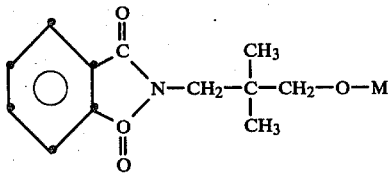

wherein M represents hydrogen or the residue of a multifunctional acid or derivative thereof. Another preferred imide intermediate comprises the reaction product of trimellitic anhydride and 2,2-dimethyl-3-amino-1-propanol having the formula

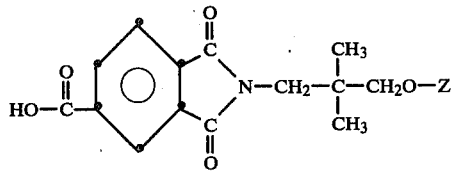

where Z represents hydrogen or the residue of a carboxylic acid or derivative thereof.

As indicated by the above formulas, it may be desirable to esterify the hydroxyl portion of the alkanolamine with a carboxylic acid or derivative thereof either after or simultaneously with the formation of the imide linkage. When this esterification is done, Z in Formula I will represent the residue of a carboxylic acid or derivative thereof. Such an esterification can be used to achieve a number of end results.

For example, if a monocarboxylic acid is employed to esterify the hydroxyl group, the hydroxyl end of the imide intermediate is not available for further reaction, thereby causing the imide moiety to be included in the final resin as a pendent group. In this instance, the imide-forming reactant must be a tri- or tetracarboxylic acid or a derivative thereof; that is, n in Formula II must be 1 or 2.

Alternatively, the hydroxyl group may be esterified with a di-, tri- or tetrafunctional carboxylic acid. In this case, if n in Formula II is 1 or 2, the imide-containing intermediate can be incorporated into the backbone of the modified polyester resin. If n in Formula II is 0, then incorporation of the imide-containing intermediate into the final resin will occur by reaction of the free carboxyl groups at the now-esterified hydroxyl end of the intermediate, and the imide group will again be contained as a pendent group in the resin structure.

Esterification of the hydroxyl group can conveniently be achieved by reacting the alkanolamine with the imide-forming reactant in a molar ratio of 1:2. In this manner, the imide-forming reactant is involved in the formation of the imide linkage at the amino end of the alkanolamine and is involved in the formation of the ester linkage at the hydroxyl end. Of course, the imide-forming reactant and the ester-forming reactant, if employed, are chosen so that the imide intermediate provides at least one hydroxyl or carboxyl group which is available for reaction with the polyester-forming components of the resin system.

The amide-forming reactants which are suitable for use in the present invention are carboxylic acids and derivatives thereof, such as esters, etc. Preferred amide-forming reactants are dicarboxylic acids which are typically employed in the preparation of coating compositions. Such acids include isophthalic acid, terephthalic acid, adipic acid, azelaic acid, fumaric acid, sebacic acid, etc. Other amide-forming reactants which can be mentioned include dimethyl isophthalate, dimethyl terephthalate, dimethyl adipate, dimethyl azelate, dimethyl glutarate, dimethyl succinate, and other esters. Mixtures of all of the foregoing are also suitable.

Thus, the amide intermediates employed in the present invention have the following formula

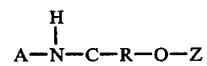

wherein R has the meaning described above, Z represents hydrogen or the residue of a carboxylic acid or derivative thereof, and A represents the residue of a carboxylic acid or derivative thereof. Of course, the amide intermediate provides at least one hydroxyl or carboxyl group which is available for reaction.

As with the imide intermediates, the hydroxyl group of the amide intermediate can be esterified with a carboxylic acid or derivative thereof (such as acid halides, acid anhydrides, etc.) so as to cap the amide intermediate, introduce additional reactive carboxylic acid groups, etc.

The modified polyester resins of the present invention further comprise a polyester-forming polyol. Such polyols are well known in the coatings art, and specific criteria for their selection are apparent to the skilled artisan. Factors to be considered in such a selection include solubility of the final resin in common solvents, properties of cured coatings prepared from the resin, etc. Typical polyols include glycols, such as 1,3-butanediol, 1,4-butanediol, cyclohexanedimethanol, diethylene glycol, dipropylene glycol, ethylene glycol, 1,6-hexanediol, neopentyl glycol, 1,2-propanediol, 1,3-propanediol, etc., as well as polyols of higher functionality, such as glycerine, pentaerythritol, trimethylolethane, trimethylolpropane, etc. Preferred polyester-forming polyols include trimethylolpropane, trimethylolethane, pentaerythritol, 1,2-propylene glycol, neopentyl glycol, and mixtures thereof.

The resins of the present invention further comprise a polyester-forming multifunctional acid or derivative thereof. Such derivatives can include, for example, acid anhydrides, esters, acid halides, etc. Such acids and derivatives thereof are well known in the art, and their selection is governed by criteria similar to those mentioned above with regard to the polyester-forming polyols. For example, aromatic multifunctional acids, such as isophthalic acid, can be chosen if it is desirable to build hardness and rigidity into the final resin. Or, if flexibility is a desirable trait, aliphatic acids, such as adipic acid, may be employed. The choice of reactants may be further facilitated by use of alkyd resin calculations and polyester resin calculations which are widely known from the literature.

Among the multifunctional acids and derivatives suitable for use in the present invention can be mentioned adipic acid, azelaic acid, 1,2-cyclohexanedicarboxylic acid, 1,4-cyclohexanedicarboxylic acid, fumaric acid, glutaric acid, isophthalic acid, maleic acid, maleic anhydride, phthalic acid, phthalic anhydride, succinic acid, succinic anhydride, terephthalic acid, pyromellitic dianhydride, pyromellitic acid, trimellitic acid, trimellitic anhydride, etc.

Preferred polyester-forming multifunctional acids or derivatives thereof include trimellitic anhydride, phthalic anhydride, isophthalic acid, adipic acid, azelaic acid, terephthalic acid, and mixtures thereof.

The resin of the present invention may optionally further comprise a fatty oil or an unsaturated fatty acid derived from a fatty oil. Preferably, such fatty acids contain about 12 to 24 carbon atoms. The inclusion of fatty oils or acids in coating compositions is well known and produces a resin which commonly is termed an alkyd resin. Among such oils and acids can be mentioned castor oil, coconut oil, fish oil, linseed oil, palm oil, safflower oil, soybean oil, sunflower oil, tall oil, linoleic acid, linolenic acid, ricinoleic acid, stearic acid, etc. Preferably, the resin comprises a fatty acid selected from linoleic acid, linolenic acid, oleic acid, or mixtures thereof.

In those resin compositions which include a fatty oil or an unsaturated fatty acid, the fatty oil or acid comprises about 30 to 60% by weight of the resin. Preferably, the fatty oil or acid, if present, is provided in an amount of about 40 to 50% by weight.

The modified polyester resin of the present invention is prepared by commonly employed polyester-forming techniques. The reaction is commonly conducted at elevated temperature under an inert atmosphere (e.g., nitrogen, argon, etc.). Temperatures which are suitable for forming the polyester resins of the present invention generally range between about 120° and 250° C., with the preferred range being about 160° to 230° C.

The reaction may be conducted either with or without a catalyst. When a catalyst is desired, conventional catalysts are employed in the preparation of the polyester. For example, reaction can be effected in the presence of catalytic amounts of transition metal compounds, such as organic and inorganic compounds of antimony, titanium, tin, etc. Preferred catalysts are organic compounds of titanium and tin, such as alkyl stannoic acids, titanium alkanoates, etc. Usually, the catalysts, if employed, will be present in an amount of about 0.01 to 1 weight percent, based upon the total weight of reactants.

The reactants may all be reacted in a single operation or, alternatively, sequential operation may be employed. For example, the alkanolamine and the imide-forming or amide-forming reactant may be subjected to reaction conditions until the amide or imide intermediate is formed. The product can then be isolated or, preferably, the polyester-forming components are charged to the reaction vessel and the resin-forming reaction is continued.

Alternatively, the polyester-forming components can be reacted so as to form a prepolymer which is then reacted with the alkanolamine and the imide-forming reactant or amide-forming reactant so as to form the modified polyester resin. Another suitable reaction scheme involves charging all reactants together with catalyst, if used, to a reaction vessel and then subjecting the reactants to reaction conditions, e.g., by staged increases in temperature, until the desired degree of polymerization has been achieved.

It will be apparent to the person of ordinary skill in the art in what manner the various components of the resin should be reacted so as to produce a resin which is suitable for a particular desired end use.

The progress of the resin-forming reaction can be followed by monitoring the amount of distillate (e.g., water) produced by the reaction or by taking samples at selected intervals and determining such properties as acid number and viscosity. The final resin will have an acid number less than about 20 (preferably, less than about 10) and a number average molecular weight of about 600 to 3000 (preferably, about 1250 to 2250).

The resins produced as described above are useful in a number of applications. Certain of the compositions, particularly the imide-containing resins and those amide-containing resins which comprise a fatty oil or fatty acid, (i.e., alkyd amides) exhibit extremely advantageous coating properties. In particular, coating compositions prepared from these resins exhibit fast air-drying characteristics and also are capable of containing a high solids content. This combination of desirable properties is surprising, yet highly advantageous. The resins further demonstrate excellent solubility characteristics. Furthermore, certain of the resins, especially the imide-containing resins, demonstrate excellent compatibility with other film-forming materials, such as the cellulose esters (e.g., cellulose acetate butyrate).

While not wishing to be bound by theoretical considerations, it is believed that this highly advantageous combination of properties is attributable to the inclusion in the resins of the branched primary alkanolamine group. This moiety provides excellent solubility properties which are not demonstrated by resins which employ linear alkanolamines such as ethanolamine. These excellent solubility properties provide better compatibility of the resins of the present invention in typical polyester coating solvents.

The air drying and solids loading properties of the resins are also believed to be improved due to the presence of the branched primary alkanolamine moiety. The air drying properties of resins are typically improved by increases in the glass transition temperature of the resin. However, increases in glass transition temperature ordinarily entail increases in molecular weight which have adverse affects upon the solids loading capability of the final coating composition containing the resin. However, the resins of the present invention provide both high solids content and good air drying properties. This is believed to be due to an increase in the glass transition temperature of the resin due to hydrogen bonding of the amide and imide groups, which are more polar than the ester groups employed in typical coating compositions. This increase in glass transition temperature is accomplished without significant increases in molecular weight. Therefore, high solids content of the final coating composition is still possible, even with the improvement in air drying properties due to the increase in glass transition temperature of the resin.

It has been observed that the amide-containing resins of the present invention provide relatively less humidity resistance as compared to the imide-containing resins, presumably due to the more hydrophilic nature of the amide linkage.

The amide-containing compositions of the present invention which do not also include a fatty acid or fatty oil component (i.e., polyesteramides) exhibit properties which make them useful in the preparation of flexographic inks. Such properties include excellent alcohol solubility, good adhesion characteristics, and compatibility with other film-forming resins, such as the cellulose esters (e.g., cellulose acetate butyrate).

The resins of the present invention are useful in the preparation of coating compositions such as enamels, lacquers, etc. Such compositions contain, in addition to the resin of the present invention, such components as solvents, pigments, curing promoters, anti-skinning agents, crosslinking agents, flow control agents, etc. The selection of the various components to be incorporated into a given coating composition will depend upon the intended end use of the composition and will be readily apparent to a person of ordinary skill in the art. Typically, the concentration of the resin of the present invention employed in a given coating composition will range from about 5 to 50 weight percent or more.

The invention will be further illustrated by the following Examples although it will be understood that these Examples are included merely for illustration and are not intended to limit the scope of the invention.

EXAMPLE 1

This Example illustrates the preparation of an amide-containing alkyd resin in accordance with the present invention.

Trimethylol propane (92 grams), Pamolyn ® 200, a commercial composition comprising linoleic fatty acid available from Hercules (196 grams), and Tyzor ® OG (0.5 grams; a commercial catalyst available from DuPont comprising the reaction product of titanium and octylene glycol) were charged to a reaction system which included a steam-jacketed packed partial condenser. The reaction system was heated at 220° C. for about 75 minutes, at which time the acid number was determined to be less than about 10. Isophthalic acid (205 grams) and 2,2-dimethyl-3-amino-1-propanol (110 grams) were then charged to the reaction system. Heating was continued at 200° to 220° C. for an additional 4½ hours at which time the acid number was again determined to be less than about 10. Trimellitic anhydride was then added in increments, the initial charge being 9 g, 3 g of trimellitic anhydride being added after an additional 2 hours, and 6 g of trimellitic anhydride being added after another 2 hours. The reaction was continued at 220° C. until there were obtained an acid number less than about 6 and an ICI viscosity of 8-9 when measured at 150° C. The ICI viscosity was measured in accordance with the method set forth in the article entitled "The Measurement of Resin Viscosity During Manufacture: A High Temperature Cone and Plate Viscometer" by P. S. Pond and C. J. H. Mong, *J. Oil Col. Chem. Assoc.*, 53, 876-83, 1970. The reaction system was cooled and methyl n-propyl ketone was added as a solvent. The acid number, hydroxyl number, and number average molecular weight of the resin were determined by well-known methods. The viscosity of the resin in the neat state was determined at 150° C. The content of non-volatiles in the resin formulation was determined in accordance with ASTM Test Method D2697-73 (1979), the Gardner-Holt viscosity was determined by well-known methods, and the Gardner color of the resin was determined in accordance with ASTM Test Method D1544-80. The results of the above tests are given in Table I.

TABLE I

| | |
|---|---|
| Acid Number | 4.1 |
| Hydroxyl Number | 0 |
| Molecular Weight, ($M_n$) | 1,500–1,700 |
| Viscosity (poise) | 8.3 |
| Nonvolatiles (Wt. %) | 75 |
| Gardner-Holdt Viscosity | $Z_2$–$Z_3$ |
| Gardner Color | 12–13 |

A high-solids air-dry alkyd enamel was prepared from the resin described above. The enamel contained 46.85 weight percent of a solution of the resin in methyl n-propyl ketone at the resin:solvent ratio of 75:25; 28.73 weight percent of TiPure R-960 pigment, which is a titanium dioxide pigment available from DuPont; 16.48 weight percent of methyl n-amyl ketone solvent; 6.72 weight percent of toluene; 0.41 weight percent of a 20% solution in methyl n-propyl ketone of a fluorocarbon flow control agent available under the trademark FC-430 from 3M; 0.27 weight percent of 6% cobalt; 0.27 weight percent of 6% manganese naphthenate; 0.15 weight percent of Activ-8 ® accelerator which is available commercially from R. J. Vanderbilt Co.; and 0.12 weight percent of Exkin No. 2 anti-skinning agent which is available commercially from Tenneco.

The solution properties of the enamel composition were determined and are given below in Table II. The solution viscosity was determined by the Ford Viscosity Cup Method (ASTM D1200-70) using a No. 4 Ford Cup. The ratio of pigment to binder was determined, and the nonvolatiles content of the enamel was determined as described above. The results are given in Table II.

TABLE II

| | |
|---|---|
| Nonvolatiles (Wt. %) | 63.9 |
| Pigment/Binder | 44/55 |
| Viscosity (Seconds) | 32 |

Film properties of the enamel described above were determined using 3.0 mil films coated on a glass substrate by the wet draw-down method. The drying time properties were determined in accordance with ASTM D1640-69 (1974), with the tack-free measurement involving a 200 gram ZAPON measurement. The Tukon hardness was determined in accordance with ASTM 1474-68 (1979) after seven days. The results are given in Table III.

TABLE III

| Dry Time (Mins.) | |
|---|---|
| Set to Touch | 5 |
| Tack Free | 25 |
| Tukon Hardness (Knoops) | 8.9 |

Other film properties were determined using film thicknesses of 1.5 to 2.0 mil (dry) on cold-rolled steel which had been pretreated with Bonderite ® B-37 which is available commercially from the Parker Company Division of Hooker Chemicals and Plastics. The films were air-dried seven days prior to measurement of properties. The pencil hardness test was conducted in accordance with ASTM D3363-74 (1980); impact resistance measurements were conducted in accordance with ASTM D2794-69 (1974); the cross-hatch adhesion measurements corresponded to ASTM D3359-78; the conical mandrel flexibility test is described in ASTM D522-60 (1979); the chemical and water resistance tests were conducted as in ASTM 1308-79, with the chemical resistance test being conducted for one hour at room temperature, the water resistance test having been conducted after a 24-hour period of immersion, and the early water resistance test having been conducted by spotting the coating for one hour with water after drying the coating for four hours; the salt spray resistance test was conducted in accordance with ASTM B117-73 (1979), with the results indicating the creepage of the coating from a scribe; and the accelerated weathering test was conducted by means of a 50-hour dew cycle with the results being given in terms of percent gloss retention at a 60° angle of incidence. The results are given in Table IV.

TABLE IV

| | |
|---|---|
| Pencil Hardness | 4B |
| Impact Resistance (in. lb.) | |
| Direct | 10 |
| Reverse | <4 |
| Cross-hatch Adhesion | 80% Pass |
| ⅛" Conical Mandrel Flexibility | Fail ⅛" |
| Chemical Resistance | |
| H₂SO₄, 50% | Very Slight |
| NaOH, 50% | No Effect |
| Water Resistance (% Gloss Retention) | 38 |
| Salt Spray Resistance (mm) | 1 |
| Early Water Resistance | Severe Wrinkling |

A review of the data of Tables I–IV indicates the desirable film properties provided by an enamel prepared from the resin of the present invention. The enamel demonstrates the highly advantageous combination of high solids content and fast dry properties. The enamel further demonstrated relatively low viscosity at high solids content. Films formed from the enamel had good hardness properties, but relatively poor water resistance properties.

EXAMPLE 2

This Example illustrates the preparation of an imide-containing alkyd resin and of an air-dry enamel prepared therefrom.

Two moles each of phthalic anhydride (296 g) and 2,2-dimethyl-3-amino-1-propanol (206 g) were heated to 150° C. in the presence of 200 ml of m-xylene. The equipment employed comprised a 3-liter reactor with a water trap and agitator. Heating was continued for 2¼ hours until 36 g of water condensate had been collected. Upon completion of reaction, the reaction system was cooled to 100° C. and an additional two moles of phthalic anhydride (296 g) was added. The temperature was increased to 170° C. and was held there for 1½ hours. The xylene was then distilled off, and the product was collected in the neat state (100% solids). It was characterized as having an acid value of 144 and as having the following structure:

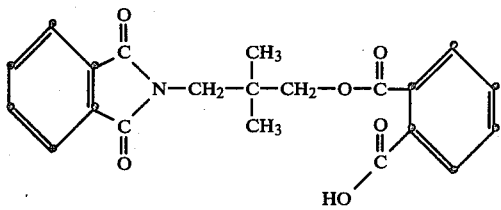

The imide prepared as described above was employed in the preparation of an alkyd-imide air-dry resin. To a reaction vessel were charged the imide (162.5 g), trimethylol propane (249.2 g), Pamolyn ® 200 (412.8 g), and isophthalic acid (266.5 g), as well as one gram of Fascat ® 4100 catalyst. The reaction system comprised a steam-jacketed packed partial condenser. The reaction system was heated to 170° C. over a period of 30 minutes. The temperature was then raised over a period of another 30 minutes to 200° C. and was then increased further to 220° C. over a period of 1¼ hours. The reaction system was maintained at 220° C. under a nitrogen flow of 0.6 SCFM for three hours until the resin exhibited an acid number less than 10 and an ICI viscosity of 11 at 125° C. The resin was cooled and methyl n-propyl ketone was added as solvent. The properties of the resin were determined as described in Example 1, and the results are given below in Table V.

TABLE V

| | |
|---|---|
| Acid Number | 9 |
| Hydroxyl Number | 37 |
| Molecular Weight (Mn) | 2200 |
| Nonvolatiles (Wt. %) | 80 |
| Gardner-Holdt Viscosity | $Z_1-Z_2$ |
| Gardner Color | 8–9 |

An enamel having the following composition was prepared from the alkyd-imide air-dry resin prepared as described above: 41.22 weight percent of the above-described resin; 32.51 weight percent TiPure R-960 titanium dioxide pigment; 11.87 weight percent xylene; 11.87 weight percent methyl n-propyl ketone; 1.27 weight percent Hex-Cem ® calcium, 5% (a melamine crosslinking agent available commercially from Nuodex); 0.58 weight percent Hex-Cem ® cobalt, 6%; and 0.58 weight percent Hex-Cem ® zirconium, 12%. The enamel having the above composition exhibited the following solution properties, determined as described above in Example 1.

TABLE VI

| | |
|---|---|
| Nonvolatiles (Wt. %) | 65.48 |
| Pigment/Binder | 50/50 |
| Ford Cup Viscosity (Secs.) | 29 |

Films of the above-described enamel on cold-rolled steel pretreated with Bonderite ® B-1000 were prepared. The films had a dry thickness of 1.5 to 2 mils. The properties of the films were evaluated as in Example 1 after having been air-dried for seven days. The results are given below in Table VII.

TABLE VII

| | |
|---|---|
| Pencil Hardness | HB |
| Impact Resistance (in. lb.) | |
| Direct | 160 |
| Reverse | 100 |
| Water Resistance | 100 - No Effect |
| (% Gloss Retention) | |
| ⅛" Conical Mandrel Flexibility | Pass |
| Cross-Hatch Adhesion | 100% Pass |
| Chemical Resistance | |
| NaOH, 50% | No Effect |
| H₂SO₄, 50% | No Effect |
| Early Water Resistance | No Effect |
| Salt Spray Resistance (mm) | 1 |

The drying properties of the enamel were determined as in Example 1 and the results are given below in Table VIII.

TABLE VIII

| | |
|---|---|
| Set to Touch | 5 Min. |
| Tack Free | 2 Hr. |

A review of the data of Tables V–VIII demonstrates that coatings prepared from this enamel composition which comprises the novel modified polyester resin of the present invention demonstrated a very good balance of coating properties. The coatings exhibited rapid drying properties, early hardness, early water resistance, and good adhesion, impact, flexibility, and chemical resistance properties coupled with low viscosity at high solids content.

EXAMPLE 3

This Example illustrates the preparation of a hydroxyl-functional amide-containing polyester and an enamel prepared therefrom.

Adipic acid (219 grams) and 2,2-dimethyl-3-amino-1-propanol (309 g) were charged to a reaction system which comprised a steam-jacketed packed partial condenser. The reaction system was blanketed with nitrogen gas at a flow rate of 0.4 SCFM. The reaction was conducted in the absence of a catalyst. The reaction system was heated to 160° C. over a period of 30 minutes and was then heated to 200° C. over an additional period of 30 minutes and was held at 200° C. for 45 minutes until the resin exhibited an acid number of 10. Trimellitic anhydride (96 g) was then added to the reaction system, and the temperature was increased to 220° C. over a period of time of 1¼ hours. The reaction system was heated at 220° C. for an additional 1½ hours until the resin exhibited an acid number less than about 10. The resin was collected in the neat state, and the properties of the resin were determined as described above in Example 1. The results are given below in Table IX.

TABLE IX

| Acid Number | 10 |
| --- | --- |
| Hydroxyl Number | 110 |
| Molecular Weight ($M_n$) | 800–900 |
| Nonvolatiles (Wt. %) | 70 |
| Gardner-Holdt Viscosity | B |
| Gardner Color | 7–8 |

An enamel having the following composition was prepared from the resin described above: 37.38 weight percent ethyl alcohol; 28.04 weight percent of the resin prepared as described above; 24.92 weight percent of TiPure R-960 titanium dioxide pigment; 9.35 weight percent Cymel® 303 (a melamine crosslinking resin available commercially from the American Cyanimide Company); and 0.31% by weight of a 20% solution of FC-430. The solution properties were determined as in Example 1, and the results are given in Table X.

TABLE X

| Nonvolatiles (Wt. %) | 60% |
| --- | --- |
| Pigment/Binder | 40/60 |
| Ford Cup Viscosity (Seconds) | 17 |

Films were prepared from the enamel described above, and the film properties were measured. The gloss was measured at angles of 60° and 20° in accordance with ASTM D523-80; the solvent resistance of the films was measured by determining the number of double rubs with methyl ethyl ketone which the coating could withstand; and the humidity resistance was determined in accordance with ASTM D2247-68 (1980), using a temperature of 140° F. over a 48-hour period to time. All other tests were performed as described above in Example 1. The results are given in Table XI.

TABLE XI

| Gloss | |
| --- | --- |
| 60° | 85 |
| 20° | 70 |
| MEK Rubs | 150 |
| Pencil Hardness | 4H |
| Impact (in. lb.) | |

TABLE XI-continued

| Direct | 50 |
| --- | --- |
| Reverse | 15 |
| Stain (10 = None) | |
| Iodine - 10 Min. | 6 |
| Iodine - 30 Min. | 6 |
| Salt Spray Resistance (Inches) | ¼ |
| Humidity Resistance | Blisters, Med. #6 |

The resin of the present Example demonstrated excellent solubility in alcohol solvents. The resin furthermore was highly compatible with cellulose esters such as cellulose acetate butyrate and cellulose acetate propionate. It also demonstrates good adhesion properties. This combination of properties, in conjunction with the above data, indicates its usefulness as an ink binder for flexographic printing.

EXAMPLE 4

This Example illustrates the preparation of a hydroxyl-functional imide-containing polyester resin and of an enamel prepared therefrom.

An imide was prepared by reacting ½ mole each of trimellitic anhydride (96 g) and 2,2-dimethyl-3-amino-1-propanol (51.5 g) in the presence of 552 g of toluene in a 1-liter reactor with a water trap and agitator. The reaction mixture was refluxed at 140° C. under nitrogen. After a reaction time of 4.5 hours and the collection of 10 grams of condensate, the mixture was cooled to 25° C. and the white precipitated product was filtered and dried. The product exhibited an acid number of 179 and was characterized as having the following structure as the major component (about 90%):

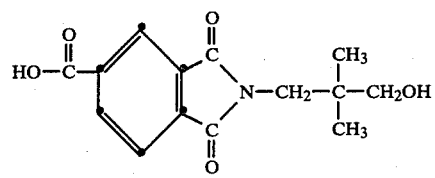

A polyester resin was prepared from the imide described above. To a reaction apparatus which included a steam-jacketed packed partial condenser were charged neopentyl glycol (83.20 grams), trimethylol propane (17.88 grams), isophthalic acid (66.40 grams), adipic acid (58.40 grams), and 221.60 grams of the imide described above. The reaction mixture was heated to 200° C. over a period of time of one hour while maintaining a nitrogen flow of 0.2 SCFM. The temperature was maintained at 200° C. for about 30 minutes and was then raised to about 220° C. over a period of time of about 30 minutes. The reaction temperature was maintained at 220° C. for an additional 3½ hours until the resin exhibited an acid number of 18. The heating was discontinued and the resin was collected in the neat state. The resin properties were determined as described above, except that the molecular weight was determined by vapor pressure osmometry and the ICI viscosity was determined at a temperature of 175° C. The resin properties are given below in Table XII.

TABLE XII

| Acid Number | 18 |
| --- | --- |
| Molecular Weight | 2500 |
| Nonvolatiles (Wt. %) | 100 |

TABLE XII-continued

| ICI Viscosity (Poise) | 7 |
|---|---|

An enamel was prepared from the resin described above. The enamel had the following composition: 31.36% by weight of the imide-containing polyester resin; 27.88% by weight of TiPure R-960 titanium dioxide pigment; 20.73% by weight of methyl isobutyl ketone; 10.45% by weight of Cymel ® 303; 9.24% by weight of EE acetate (2-ethoxyethyl acetate); and 0.34% by weight of a 20% solution of FC-430. The solution properties of the resin were determined as described above and are given below in Table XIII.

TABLE XIII

| Nonvolatiles (Wt. %) | 70 |
|---|---|
| Pigment/Binder | 40/60 |
| Ford Cup Viscosity (Seconds) | 340 |

A 1.25 mil thick film of the enamel was prepared, and the film properties were determined as described above. The salt-spray test was conducted for a period of time of 250 hours. The results of the tests are given below in Table XIV.

TABLE XIV

| Gloss | |
|---|---|
| 60° | 91 |
| 20° | 72 |
| MEK Double Rubs | 200+ |
| Pencil Hardness | 5H |
| Impact (in. lb.: Direct/Reverse) | |
| Cured 20 Min. @ 325° C. | 160/75 |
| Cured 20 Min. @ 375° C. | 160/160 |
| Stain (10 = None) | |
| Iodine - 10 Min. | 10 |
| Iodine - 30 Min. | 10 |
| Mustard - 24 Hrs. | 10 |
| Ink - 24 Hrs. | 10 |
| Salt Spray | No Creepage |
| Humidity - 48 Hrs. @ 140° F. | No Blisters |
| - 1000 Hrs. @ 120° F. | No Blisters |
| Chemical Resistance | |
| NaOH (50%) | No Etch |
| H$_2$SO$_4$ (50%) | No Etch |

A review of the data of Tables XII–XIV indicates that the resin of this Example provides a baking enamel having excellent properties. The coatings prepared from this enamel demonstrate a good solvent resistance, high hardness values coupled with excellent impact and flexibility, superior stain resistance, and excellent chemical and humidity resistance.

EXAMPLE 5

This Example illustrates the preparation of an imide-containing polyester modifying resin. Modifying resins are used in the formulation of a variety of lacquer-type coatings for metal and wood. They are not used as the sole film former, but are blended with other resins, such as cellulose nitrate, cellulose acetate butyrate, or vinyl resins. This Example further illustrates the preparation of an imide-containing polyester resin by a procedure which does not involve the isolation of the imide intermediate.

To a reaction system which included a steam-jacketed open condenser were charged 2,2-dimethyl-3-amino-1-propanol (273 g) and phthalic anhydride (392 g) together with 100 g of xylene as a solvent. The reaction mixture was heated to 100° C. over a period of time of 15 minutes and was then further heated at a maximum temperature of 150° C. under a nitrogen flow of about 1 SCFM until the resin exhibited an acid number less than about 1 (about 1½ hours). At that time, neopentyl glycol (96 g), trimethylol propane (42 g), and trimellitic anhydride (299 g) were added to the reaction mixture. For this second stage reaction, a steam-jacketed partial condenser was employed. The temperature was increased to 200° C. over a period of time of about 45 minutes and was then further increased to 220° C. and held at that temperature until the acid number of the resin was about 16 (i.e., about 5 hours). The reaction was conducted in the absence of a catalyst. The heating was discontinued, and the reaction system was cooled to about 150° C., at which point the resin was collected in the neat state. The resin properties were determined in accordance with the procedures outlined above. The Gardner-Holdt viscosity and Gardner color were then determined using a 50% solution of the resin in a 1:1 blend of toluene and acetone. The properties of the resin are summarized below in Table XV.

TABLE XV

| Acid Number | 16 |
|---|---|
| Hydroxyl Number | 59 |
| Molecular Weight | 950–1000 |
| Gardner-Holdt Viscosity | A |
| Gardner Color | 5/6 |

A lacquer was formulated from the imide-containing polyester resin described above. The lacquer comprised 85% by weight of a solvent blend having the following composition: 51.1% by weight toluene, 13.87% by weight isopropyl alcohol, 11.21% by weight acetone, 9.23% by weight xylene, 7.62% by weight methyl isobutyl ketone, and 6.88% by weight EE acetate (2-ethoxyethyl acetate). The lacquer further comprised 7.50% by weight of the imide-containing polyester described above, 7.05% by weight of cellulose acetate butyrate, and 0.45% by weight of black pigment.

A film of the lacquer composition described above was prepared, and the properties of the film were measured in accordance with procedures described above. The humidity resistance test was conducted for 48 hours at a temperature of 120° F., and the gasoline resistance test was conducted after soaking the sample for 1 hour in lead-free gasoline. The results of the tests are given below in Table XVI.

TABLE XVI

| Gloss | |
|---|---|
| 20° | 64 |
| 60° | 80 |
| Humidity Resistance | No Blisters; 100% Gloss Retention |
| Impact (in.-lb.) | |
| Direct | 100 |
| Reverse | 40 |
| Hardness (Knoops) | 20 |
| Gasoline Resistance | Softens, but Recovers |

The imide-containing polyester resin of the present Example demonstrates a good compatibility with cellulose acetate butyrate and cellulose nitrate. A review of the data of Table XVI indicates that a lacquer formulated from this resin and cellulose acetate butyrate provided a film exhibiting excellent hardness, humidity resistance, gasoline resistance, and good impact and flexibility.

While the invention has been described in detail with particular reference to preferred embodiments thereof, it will be understood that variations and modifications can be effected within the spirit and scope of the invention.

We claim:

1. A novel modified polyester resin comprising the reaction product of (A) an imide derived from an alkanolamine and an imide-forming reactant selected from phthalic acid, trimellitic acid, pyromellitic acid, maleic acid, succinic acid, anhydrides of the foregoing, and mixtures thereof, said imide having the formula

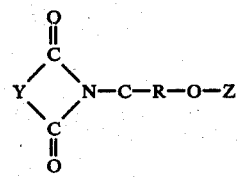

wherein R represents a branched alkyl group having about 2 to 10 carbon atoms; Y represents the residue of said imide-forming reactant; and Z represents hydrogen or the residue of a carboxylic acid or derivative thereof, provided that said imide provides at least one hydroxyl or carboxyl group which is available for reaction;

(B) a polyester-forming polyol;

(C) a polyester-forming multifunctional acid or derivative thereof; and, optionally, (D) a fatty oil or an unsaturated fatty acid having about 12 to 24 carbon atoms derived from said oil, wherein said alkanolamine is provided in an amount of about 0.5 to 30 percent by weight, based upon the total weight of reactants, and wherein said fatty oil or acid, if present, comprises about 30 to 60 percent by weight of said resin.

2. The resin of claim 1 wherein said alkanolamine comprises 2-aminomethyl-2-ethyl-1-hexanol, 2-aminomethyl-2-ethyl-1-pentanol, 2-aminomethyl-2-ethyl-1-butanol, 2-aminomethyl-2-methyl-1-butanol, 2,2-dimethyl-3-amino-1-propanol, or a mixture thereof.

3. The resin of claim 1 wherein said imide-forming reactant comprises phthalic anhydride, trimellitic anhydride, pyromellitic dianhydride, succinic anhydride, maleic anhydride, or a mixture thereof.

4. The resin of claim 1 wherein said imide has the formula

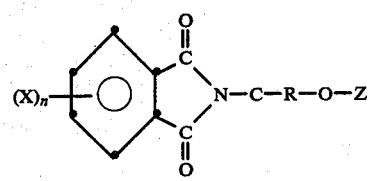

wherein R represents a branched alkyl group having about 2 to 10 carbon atoms; X represents a carboxylic acid moiety, wherein n is 0 to 2; and Z represents hydrogen or the residue of a carboxylic acid or derivative thereof, provided that said imide provides at least one hydroxyl or carboxyl group which is available for reaction.

5. The resin of claim 4 wherein said imide-forming reactant comprises phthalic anhydride, trimellitic anhydride, pyromellitic dianhydride, or a mixture thereof.

6. The resin of claim 1 wherein said polyester-forming polyol comprises trimethylolpropane, trimethylolethane, pentaerythritol, 1,2-propylene glycol, neopentyl glycol, or a mixture thereof.

7. The resin of claim 1 wherein said polyester-forming multifunctional acid or derivative thereof comprises trimellitic anhydride, phthalic anhydride, isophthalic acid, adipic acid, azelaic acid, terephthalic acid, or a mixture thereof.

8. The resin of claim 1 wherein said fatty acid comprises linoleic acid, linolenic acid, oleic acid, or a mixture thereof.

9. The resin of claim 1 wherein said resin exhibits a number average molecular weight of about 600 to 3000.

10. A novel modified polyester resin comprising the reaction product of (A) an imide derived from
  (i) an alkanolamine comprising 2-aminomethyl-2-ethyl-1-hexanol, 2-aminomethyl-2-ethyl-1-pentanol, 2-aminomethyl-2-ethyl-1-butanol, 2-aminomethyl-2-methyl-1-butanol, 2,2-dimethyl-3-amino-1-propanol, or a mixture thereof, and
  (ii) an imide-forming reactant comprising phthalic anhydride, trimellitic anhydride, pyromellitic dianhydride, succinic anhydride, maleic anhydride, or a mixture thereof,
  wherein said imide provides at least one hydroxyl or carboxyl group which is available for reaction;

(B) a polyol comprising trimethylolpropane, trimethylolethane, pentaerythritol, 1,2-propylene glycol, neopentyl glycol, or a mixture thereof;

(C) a multifunctional acid or derivative thereof comprising trimellitic anhydride, phthalic anhydride, isophthalic acid, terephthalic acid, azelaic acid, adipic acid, or a mixture thereof; and, optionally, (D) an unsaturated fatty acid comprising linoleic acid, linolenic acid, oleic acid, or a mixture thereof, wherein said alkanolamine is provided in an amount of about 0.5 to 30 percent by weight, based upon the total weight of reactants, and wherein said unsaturated fatty acid, if present, comprises about 30 to 60 percent by weight of said resin.

11. The resin of claim 10 wherein said alkanolamine is provided in an amount of about 5 to 15 percent by weight.

12. The resin of claim 10 wherein said alkanolamine comprises 2,2-dimethyl-3-amino-1-propanol.

13. The resin of claim 12 wherein said imide-forming reactant comprises phthalic anhydride.

14. The resin of claim 13 wherein said imide has the formula

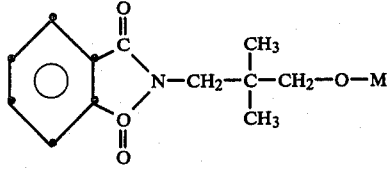

where M represents hydrogen or the residue of a multifunctional acid or derivative thereof.

15. The resin of claim 12 wherein said imide-forming reactant comprises trimellitic anhydride.

16. The resin of claim 15 wherein said imide has the formula

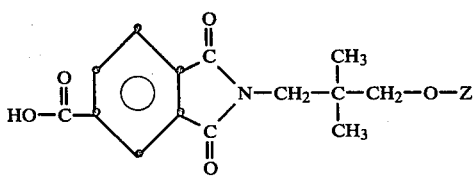

where Z represents hydrogen or the residue of a carboxylic acid or derivative thereof.

17. The resin of claim 10 wherein said fatty acid, if present, comprises about 40 to 50 percent by weight of said resin.

18. The resin of claim 10 wherein said resin exhibits a number average molecular weight of about 600 to 3000.

19. The resin of claim 18 wherein said resin exhibits a number average molecular weight of about 1250 to 2250.

20. The resin of claim 10 wherein said resin has an acid number less than about 20.

21. A novel modified polyester resin comprising the reaction product of (A) an imide having the formula

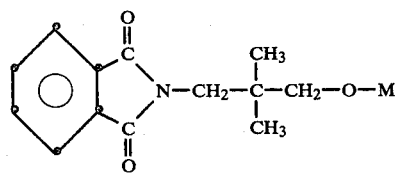 (i)

where M represents hydrogen or the residue of a multifunctional carboxylic acid or derivative thereof, or

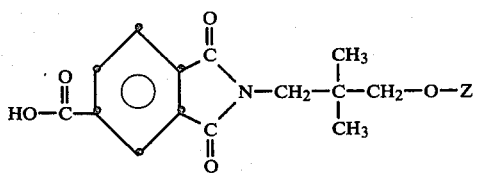 (ii)

where Z represents hydrogen or the residue of a carboxylic acid or derivative thereof;

(B) a polyol comprising trimethylolpropane, trimethylolethane, pentaerythritol, 1,2-propylene glycol, neopentyl glycol, or a mixture thereof;

(C) a multifunctional acid or derivative thereof comprising phthalic anhydride, trimellitic anhydride, terephthalic acid, isophthalic acid, azelaic acid, adipic acid, or a mixture thereof; and, optionally, (D) 40 to 50 percent by weight of an unsaturated fatty acid comprising linoleic acid, linolenic acid, oleic acid, or a mixture thereof, wherein said imide is provided in an amount such that the alkanoxyamino moiety thereof comprises about 5 to 15 percent by weight of said resin and wherein said resin exhibits a number average molecular weight of about 1250 to 2250 and an acid number less than about 20.

22. A novel modified polyester resin comprising the reaction product of (A) an amide derived from an alkanolamine and an amide-forming reactant, said amide having the formula

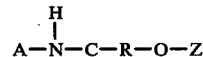

wherein R represents a branched alkyl group having about 2 to 10 carbon atoms, Z represents hydrogen or the residue of a carboxylic acid or derivative thereof, and A represents the residue of a carboxylic acid or derivative thereof, provided that said amide provides at least one hydroxyl or carboxyl group which is available for reaction;

(B) a polyester-forming polyol;

(C) a polyester-forming multifunctional acid or derivative thereof; and, optionally, (D) a fatty oil or an unsaturated fatty acid having about 12 to 24 carbon atoms derived from said oil, wherein said alkanolamine is provided in an amount of about 0.5 to 30 percent by weight, based upon the total weight of reactants, and wherein said fatty oil or acid, if present, comprises about 30 to 60 percent by weight of said resin.

23. The resin of claim 22 wherein said alkanolamine comprises 2-aminomethyl-2-ethyl-1-hexanol, 2-aminomethyl-2-ethyl-1-pentanol, 2-aminomethyl-2-ethyl-1-butanol, 2-aminomethyl-2-methyl-1-butanol, 2,2-dimethyl-3-amino-1-propanol, or a mixture thereof.

24. The resin of claim 23 wherein said alkanolamine comprises 2,2-dimethyl-3-amino-1-propanol.

25. The resin of claim 22 wherein said alkanolamine is provided in an amount of about 5 to 15 percent by weight.

26. The resin of claim 22 wherein said amide-forming reactant comprises isophthalic acid, terephthalic acid, adipic acid, azelaic acid, fumaric acid, sebacic acid, or a mixture thereof.

27. The resin of claim 22 wherein said polyester-forming polyol comprises trimethylolpropane, trimethylolethane, pentaerythritol, 1,2-propylene glycol, neopentyl glycol, or a mixture thereof.

28. The resin of claim 22 wherein said polyester-forming multifunctional acid or derivative thereof comprises trimellitic anhydride, phthalic anhydride, isophthalic acid, terephthalic acid, adipic acid, azelaic acid, or a mixture thereof.

29. The resin of claim 22 wherein said fatty acid comprises linoleic acid, linolenic acid, oleic acid, or a mixture thereof.

30. The resin of claim 22 wherein said fatty acid, if present comprises about 40 to 50 percent by weight of said resin.

31. The resin of claim 22 wherein said resin exhibits a number average molecular weight of about 600 to 3000.

32. The resin of claim 31 wherein said resin exhibits a number average molecular weight of about 1250 to 2250.

33. The resin of claim 22 wherein said resin has an acid number less than about 10.

* * * * *